May 11, 1926.
B. R. LA DEW
POP CORN POPPER
Filed July 26, 1924
1,584,455
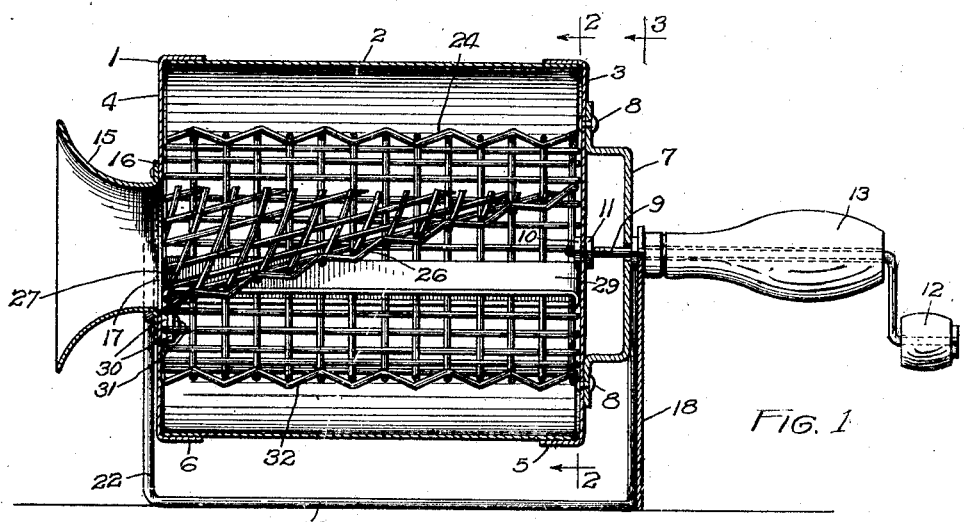
FIG. 1
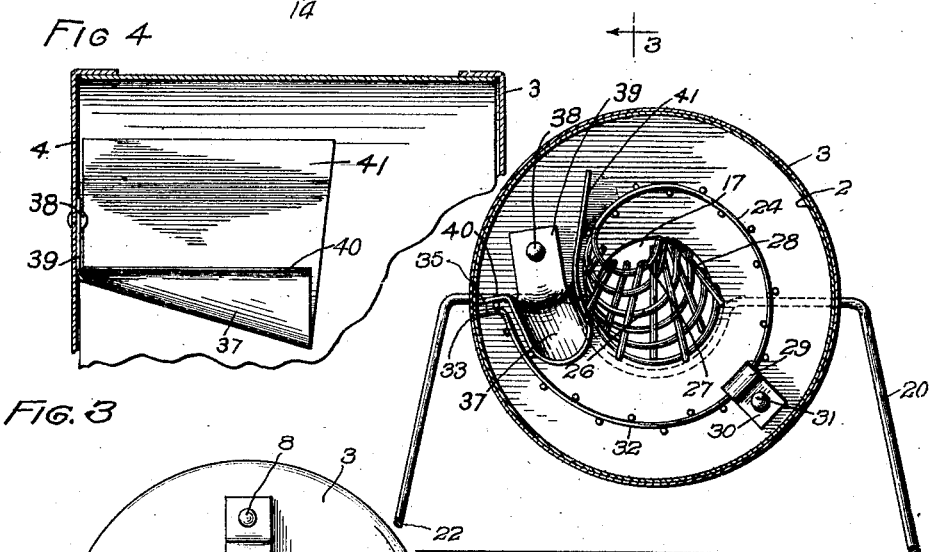
FIG. 3
FIG. 2
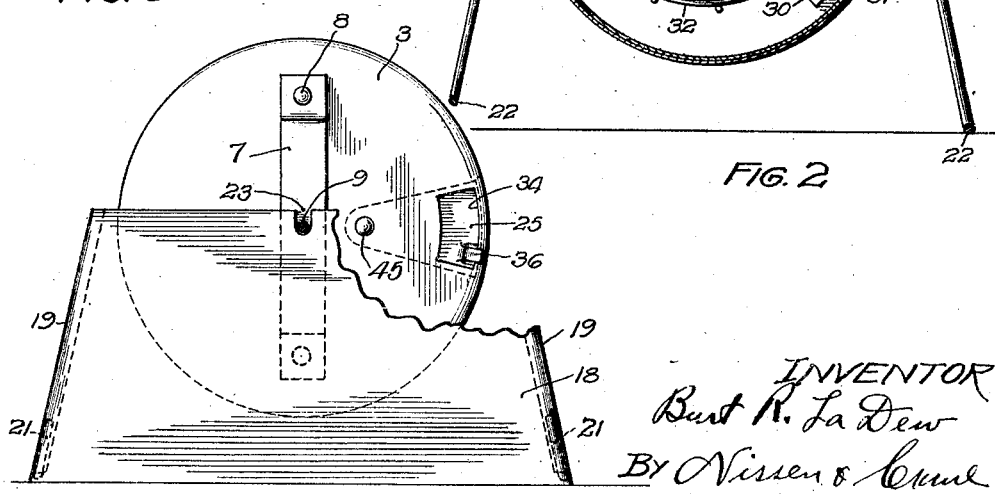
INVENTOR
Burt R. La Dew
By Nissen & Crane
ATTYS.

Patented May 11, 1926.

1,584,455

UNITED STATES PATENT OFFICE.

BURT R. LA DEW, OF CHICAGO, ILLINOIS, ASSIGNOR TO ULLRICH TINWARE COMPANY, OF CHICAGO, ILLINOIS, A CORPORATION OF ILLINOIS.

POP-CORN POPPER.

Application filed July 26, 1924. Serial No. 728,283.

This invention relates to rotary pop-corn poppers adapted for home use and has for one of its objects the provision of means to remove the grains of corn immediately after they pop or explode and to discharge the same through a central opening.

Another object of my invention is the provision of a stand to position said rotary popper over a source of heat thereby protecting the operator's hands from being burned.

A further object of my invention is to provide a pop-corn popper having means to separate the grains of popped corn from the unpopped grains.

A still further object of my invention is the provision of a corn popper comprising detachable end members and constructed to permit cleaning of all internal portions.

Another object of my invention is the provision of an imperforated chute to distribute unpopped corn over the central heated portion of the corn popper.

Other objects of the invention will appear hereinafter, the novel features and combinations being set forth in the appended claims.

In the drawings—

Fig. 1 is a longitudinal sectional view of my invention including both the rotary popper and its stand.

Fig. 2 is a transverse sectional view taken on line 2—2 of Fig. 1;

Fig. 3 is a transverse sectional view taken on line 3—3 of Fig. 1; and

Fig. 4 is a longitudinal sectional view of Fig. 2 showing the device as seen from the left with the screen member omitted.

Referring particularly to Fig. 1 it will be seen that the outer casing 1 comprises a cylinder 2 and cover-like end members 3 and 4. The end members 3 and 4 are provided with flanges 5 and 6, respectively, which overlap the cylinder 2 and tightly engage the external surface of the same. A bracket 7 is secured to the end member 3, as shown at 8 in Fig. 1. An operating shaft 9 passes through the bracket 7 and is secured to the center portion of the cover-like end member 3 by nuts 10 and 11, the nut designated by the numeral 10 being positioned on the inside of the cylindrical casing 1 and the nut 11 on the outside of said casing. The operating shaft 9 is bent at its free end to provide a crank, the horizontal portion of said crank being equipped with a wood handle 12. A wood handle 13 is journaled on the shaft 9 thereby providing a grip to protect the operator's hand from being burned.

The cover-like end member 4 has a central opening 25 therein and is provided with a wide mouth funnel or discharge spout 15. It will be seen from Fig. 1 that the spout is secured to the end member 4 by means of a circumferential flange 16 and that the funnel is positioned around the opening 17 in the end member 4. It is evident that the popped corn discharged from a funnel or spout constructed and positioned as described above, will roll or slide through the same and fall into any receptacle placed below the discharge opening. Thus the pop-corn will be discharged at one point and will not be thrown or scattered upon the floor.

A stand 14 comprising a wire 20 is provided to support the rotary member and to position the same over a source of heat. As shown in Fig. 3, one end 18 of the stand 14 is formed from sheet metal, such as tin, galvanized iron or sheet iron. The sides 19, 19 of the sheet metal end 18 are turned back so as to form a socket for the two ends 21, 21 of the wire 20 which comprises the remainder of the stand 14. The ends 21, 21 of the wire 20 are bent upwards and the portions of said wire adjoining the end portions 21, 21 extend horizontally, one on each side of the cylinder 21. As shown in Figs. 1 and 2, the horizontal portions of the wire 20 are disposed obliquely upwards to the horizontal center line of the cylinder 2, thus forming two leg members 22, 22. Said wire 20 is bent so as to be substantially horizontal at the top of said leg members 22, 22 and is disposed midway between the same to form a bearing for the discharge spout 15.

The sheet metal end plate 18 is provided with a notch in which the operating shaft 9 is journaled at the end of the cylinder 2 opposite the discharge spout 15. It has been pointed out that the operating handle is secured to the end member 3 of the cylinder 2 and that said cylinder is journaled as shown in Figs. 1, 2 and 3 so as to rotate freely when the handle or crank is turned.

Thus it is evident that the cylinder rotates relative to the stand 14 when the crank is operated.

The internal construction of the cylinder 2 is best shown in Figs. 1 and 2 wherein a specially constructed screen 24 is provided to separate the popped corn from the unpopped, to convey the popped corn from the inside of the cylinder to the outside of the same, and to disturb or agitate the unpopped grains of corn. An end view of the screen construction 24 is shown in Fig. 4 wherein it will be seen that a substantially rectangular piece of wire netting is spiraled about one and one-half revolutions. The screen construction 24 extends the entire length of the cylinder 2 and is positioned so that the inner loop or curve 26 of the spiral netting engages the end member 4 around the circumference of the central opening 17 in the same. The inner loop 26 of the spiral construction 24 extends diagonally at an angle to the longitudinal axis of the cylinder 2. It will be seen in Fig. 2 that the end 27 of the inner loop 26 engages the end member 3 and that said end is positioned so that the bottom portions of the same are above the center axis of the cylinder. Thus the inner loop 26 is inclined toward the opening 17 in the end member 4 when the cylinder is in the position shown in Figs. 1 and 2. The outer loop 32 of the screen member 24 diverges gradually from the center axis of the cylinder 2 and eventually engages the inner periphery of the same. An abrupt bend is provided near the outer edge 33 of the wire net member 24 to cause the formation of a flange 35 having a position substantially perpendicular to the inner surface of the cylinder 2.

A U-shaped brace 29 is provided to hold the wire net member 24 in place and to secure the same rigidly to the cylinder 2 so that said spiral net member 24 will rotate therewith. One member of the U-shaped brace 29 is positioned on each side of the wire netting 24 and each member terminates with a flange 30. The flanges 30 are secured by a rivet 31 to the end member 4, as shown in Fig. 1. In said figure it will be seen that the flanges are positioned one on top of the other. It is to be noted that the entire internal construction is secured to the end member 4 so that by removing the cover-like end member 4 all of the internal apparatus will be removed and hence the cylinder 2 can be easily cleaned.

The end member 3 of the cylinder 2 is provided with an opening 34 through which the unpopped corn may be introduced. The opening 34 may also be used as a discharge opening for the grains of corn that fail to explode. An inner cover 25 to the opening 34 is pivoted at 45, by means of a rivet or other pivot pin extending through the end member 3, and is provided with a lip member 36 which extends outside of the cylinder 2, thus providing means by which said cover may be opened and closed. The lip 36 also maintains the cover 25 in close relation to the end member 3 of the cylinder 2.

The foregoing description has disclosed a cylinder having an operating handle secured thereto and a stand upon which said cylinder may be positioned over a source of heat. In addition it has been pointed out that said cylinder, operating handle, discharge spout, and said internal members rotate in unison with each other when the device is manipulated. The cold grains of unpopped corn are introduced either through the opening 34 in the end member 3 or through the discharge spout 15. The mesh of the wire screen is large enough to permit unpopped corn to fall through and rest upon the heated surface of the sheet metal cylinder 2, yet it is small enough to retain grains of popped corn and prevent the same from being burned on said heated surface. As the cylinder is rotated the unpopped corn is agitated and caused to roll on the heated surface of cylinder 2 until it explodes or pops. When the corn has popped it is expanded to the extent of four or five times its original size and hence said popped corn cannot pass through the wire screen. As the cylinder continues to rotate the flange 35 on the spiral screen 24 pushes the popped corn upwards and continues to carry the same with it. When the flange 35 reaches a position near the top of the cylinder the expanded or popped corn falls into the outer portion 32 of the spiral net construction 24 and is caused to roll by continued rotation of the cylinder 2 until it falls into the inner inclined portion 26 of said spiral screen. The popped corn then rolls out of the cylinder through the spout 15 and falls into a receptacle not shown in the drawings.

By providing an abrupt flange, such as flange 35, on the screen member it is evident that the popped corn is not scooped up along with the unpopped grains, but that it is raised to a position near the top of the cylinder 2 and is then allowed to fall into the outer portion 32 of the screen 24. Thus stray grains of unpopped corn are dislodged from the corners and crevices of the popped corn and caused to fall through the screen onto the heated surface where they remain until they explode. In this manner separation of the popped corn from the unpopped grains of corn is assured. In the event that a few grains of unpopped corn remain with the popped corn until the same falls into the inner portion 26 of the screen 24 it is more than likely that said unpopped grains will fall through the wire netting comprising the inner portion 26 and eventually reach the heated surface of the cylinder. Thus the device is adapted to completely separate the popped from the unpopped material and to discharge the former through the central spout 15.

The flange 35 at the end of the screen wire spaces the main body of the wire away from the outer casing so that there is no portion of the screen wire sufficiently close to the casing to permit grains of popped corn to be wedged between the screen wire and casing. If the gradual inclination of the screen wire were continued until the edge reached the casing, any grains of corn which happened to pop while in the narrow space between the wire and casing would expand into this space and so be firmly caught. The flange 35 prevents this from occurring.

An inclined scoop 37 comprising imperforated sheet metal is secured to the end member 4 by a rivet 38. It will be seen in Figs. 2 and 4 that the scoop 37 is provided with flanges 39 and 40. The rivet 38 passes through an opening in the flange 39 and through the end member 4 thereby securing said scoop rigidly to said end member. The flange 40 is provided along the outermost edge of the scoop member and extends the entire length of the same. In Fig. 2 it will be seen that the flange 40 is positioned slightly in advance of the flange 35 of the screen member 24 and in Fig. 4 the scoop is shown to extend from the end member 4 substantially to the middle of the cylinder 2. The innermost edge 41 of the scoop 37 is prolonged so as to extend over a portion of the screen 24, thus it prevents unpopped grains of corn from falling into the inclined portion 26 of the screen 24 as the cylinder revolves and positions the scoop 37 above said screen.

When the cylinder is revolved the unpopped along with popped grains of corn tend to collect near the open end of the cylinder 2 and thus the unpopped corn would be retained on the less heated surface of the cylinder. The scoop 37 being inclined, as shown in Figs. 2 and 4, picks up that portion of the popped and unpopped corn which collects near the end member 4 and delivers the same to the middle portion of the cylinder 2. The material, comprising both popped and unpopped grains of corn, picked up by the scoop 37 is discharged upon the screen 24. The screen 24 retains the popped corn and permits the unpopped grains to fall through to the middle portion of the surface of the cylinder 2 where they are again subjected to heat.

I claim:—

1. In corn poppers, the combination with an outer sheet metal casing, of a spiral screen comprising an inner portion positioned obliquely with respect to the axis of said casing, and the step-like flange along the outermost edge, and an operating handle secured to said casing to rotate the same.

2. In corn poppers, the combination of an outer casing, an operating handle to rotate said outer casing, and a removable spiral screen to separate popped from unpopped grains of corn, said screen having an inclined inner portion to convey said popped corn out of said casing, and to agitate the grains of unpopped corn.

3. In corn poppers, the combination of an outer casing comprising a cylinder and two detachable end members, a spiral screen having attachment to one of said end members and being adapted to be removed from within said cylinder with said end member, and a discharge spout located centrally with respect to said end member being positioned to receive popped corn as the same passes from within said spiral screen.

4. The combination with a rotary corn popper, of an outer casing comprising a cylinder and two detachable end members, an operating handle secured to one of said detachable end members and independent of the other end member for permitting independent separation of each of said end members from said outer casing, a discharge spout secured to the other end member for directing the discharged popped corn into a receptacle, and a stand adapted to provide journal bearings for said operating handle and said discharge spout.

5. In corn poppers, the combination with an outer sheet metal casing, of a spiral screen comprising an inner portion positioned obliquely with respect to the axis of said casing and a step-like flange along the outermost edge, means secured to said casing and to said screen to prevent rotation of said screen relative to said casing, and an operating handle secured to said casing to rotate the same.

6. In corn poppers, the combination with a rotary outer casing comprising a cylinder and two detachable end members, of means to separate popped from unpopped grains of corn, inclined means to direct unpopped corn to the central portions of said rotary outer casing, means inclined in a direction opposite to the direction of inclination of the aforesaid means to discharge said popped grains through a central opening, and an opening to permit removal of unpopped grains of corn.

7. In corn poppers, the combination of a cylinder comprising a detachable closure for one end of said cylinder having a central discharge opening therein, an external discharge spout positioned around said opening, and a detachable closure for an end of said cylinder having an operating handle secured thereto, and independent of the aforesaid end member.

8. A pop-corn popper comprising a hollow cylinder, removable covers for opposite ends of said cylinder, a support attached to one of said covers and terminating adjacent the plane of said cover to leave the interior of said cylinder free from supporting devices, and a spiral reticulate member attached to the other of said covers for gathering popped corn and discharging it from the interior of said cylinder, a chute comprising imperforated material secured to the aforesaid cover for delivering unpopped corn to the central portions of said hollow cylinder.

9. A pop-corn popper comprising a hollow cylinder, covers for the opposite ends of said cylinder, a support attached to one of said covers and comprising a handle for rotating said cylinder, an external discharge spout attached centrally to the opposite cover of said cylinder, said cover having an opening therethrough registering with said spout, and a spiral reticulate member secured to the inner face of said last-mentioned cover for collecting popped corn from said cylinder and discharging said corn through said spout.

10. A pop-corn popper comprising a hollow cylinder, covers for the opposite ends of said cylinder, a support attached to one of said covers and comprising a handle for rotating said cylinder, a discharge spout attached centrally to the opposite cover of said cylinder, said cover having an opening therethrough registering with said spout, a spiral reticulate member secured to the inner face of said last-mentioned cover for collecting popped corn from said cylinder and discharging said corn through said spout, and a stand for pivotally engaging said support and spout at opposite ends of said cylinder for supporting said popper over a heating medium.

11. The combination with a rotary corn popper, of an outer casing comprising a cylinder and two detachable end members, an operating handle secured to one of said detachable end members, an imperforated inclined scoop secured to the other end member for distributing unpopped grains of corn over the heated portion of said cylinder, a discharge spout secured to said last-mentioned end member, and a stand adapted to provide journal bearings for said operating handle and said discharge spout.

12. In corn poppers, the combination of an outer casing comprising a cylinder and two detachable end members, a spiral wire screen having attachment to one of said end members, a flange on said wire screen, an inclined scoop comprising imperforated material positioned partly between successive loops of said spiral screen, and a flange on said inclined scoop positioned in advance of the flange on said spiral screen, said scoop extending from one of said end members substantially to the middle of said cylinder for delivering unpopped corn to the central portions of said cylinder.

13. In corn poppers, the combination with an outer sheet metal casing, of a spiral screen comprising an inner portion positioned obliquely with respect to the axis of said casing and an outer portion having a step-like flange along the outermost edge, a scoop comprising imperforated sheet metal positioned between said outer and inner screen portions, and a flange on said scoop positioned in advance of the flange on said spiral screen for delivering unpopped grains of corn to the middle portions of said outer casing.

14. In corn poppers, the combination with a rotary outer casing comprising a cylinder and two detachable end members, of means to separate popped corn from unpopped grains of corn, means to distribute said unpopped corn over the central inner surface of said outer casing, means to discharge said popped grains of corn through a central opening, and an opening to permit removal of unpopped grains of corn.

15. A pop-corn popper comprising a casing, a removable cover having a discharge opening therein, and an imperforated scoop having a step-like flange along one lateral edge and a prolonged extension on the other lateral edge, said prolonged extension being adapted to direct unpopped grains of corn away from said discharge opening.

16. A corn popper comprising a hollow cylinder, removable covers for opposite ends of said cylinder, a handle attached to one of said covers, and an imperforated scoop attached to the other end cover and extending substantially to the middle portion of said cylinder for directing unpopped corn from the ends of said cylinder to the middle portion of the same.

In testimony whereof I have signed my name to this specification on this 11th day of July, A. D. 1924.

BURT R. LA DEW.